United States Patent [19]

De Fossey

[11] 3,760,073
[45] Sept. 18, 1973

[54] TREATMENT OF WOUNDS
[75] Inventor: Bernard Mathieu De Fossey, Paris, France
[73] Assignee: Roussel UCLAF, Paris, France
[22] Filed: June 9, 1971
[21] Appl. No.: 151,569

[52] U.S. Cl. ................................. 424/243
[51] Int. Cl. .............................. A61k 17/00
[58] Field of Search .................... 424/243

[56] References Cited
UNITED STATES PATENTS
3,248,294   4/1966   Nomine et al. ............... 424/243

Primary Examiner—Shep K. Rose
Attorney—Hammond & Littell

[57] ABSTRACT

A method of healing wounds in the skin of warm-blooded animals which comprises applying to such a wound an effective amount of 17β-acetoxy-$\Delta^{4,9,11}$-estratriene-3-one of the formula

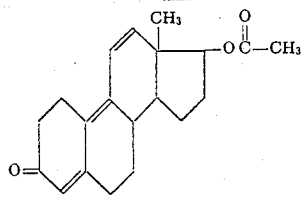

(I)

3 Claims, No Drawings

TREATMENT OF WOUNDS

STATE OF THE ART

The preparation of 17β-acetoxy-Δ$^{4,9,11}$-estratriene-3-one is described in U. S. Pat. No. 3,248,294 and its physiological activity is described therein as being anabolic with little or no androgenic activity. The said patent also discloses that the said compound may be administered orally, transcutaneously, perlingually or rectally.

OBJECTS OF THE INVENTION

It is an object of the invention to provide novel compositions for healing wounds in warm-blooded animals.

It is another object of the invention to provide a novel method of healing wounds in the skin of warm-blooded animals, particularly humans.

These and other objects and advantages of the invention will become obvious from the following detailed description.

THE INVENTION

The novel therapeutic compositions for the treatment of skin wounds are comprised of an effective amount of 17β-acetoxy-Δ$^{4,9,11}$-estratriene-3-one and an inert topical pharmaceutical carrier. The compositions may be in the form of any convenient type for topical administrations such as powders, solutions, ointments, suspensions, aerosol sprays and the like. The compositions may contain 0.5 to 10 percent, preferably 1 to 5 percent, by weight of the active ingredient.

The compositions of the invention are useful for the treatment of eschars and various wounds due to the cicatrisive and eutrophic activity of 17β-acetoxy-Δ$^{4,9,11}$-estratriene-3-one. The compositions can be used to treat skin wounds from various causes and are particularly useful to treat wounds of the aged which are known to be especially difficlut to heal.

The compositions may be combined with any suitable topical pharmaceutical carrier. Particularly useful is the powder form in which the active product is admixed with a solid inert carrier, such as amino acids such as valine, lysine and glycine, talc, polyhydroxylated compounds such as mannitol, inositol and the like. Another convenient form is the aerosol spray.

The novel method of treating skin wounds comprises applying to skin wounds of warm-blooded animals, particularly humans, an effective amount of 17β-acetoxy-Δ$^{4,9,11}$-estratriene-3-one.

In the following examples there are described several preferred embodiments to illustrate the invention. However, it should be understood that the invention is not limited to the specific embodiments.

EXAMPLE I

PREPARATION OF
17β-acetoxy-Δ$^{4,9,11}$-estratriene-3-one

STEP A:
3-chloro-5-acetoxy-17β-benzoyloxy-4,5-seco-Δ$^{2,5(10),9(11)}$-estratriene 4 gm of 3-chloro-17β-benzoyloxy-4,5-seco-Δ$^{2,9}$-estradiene-5-one were dissolved in 100 cc of toluene. 160 mg of p-toluene sulfonic acid and 16 cc of acetic anhydride were added and the reaction mixture was refluxed for a period of 5 hours, under an atmosphere of nitrogen, to reach an interior temperature of from 111°–112°C. The reaction product was washed with an aqeous solution saturated with sodium bicarbonate and with water. The product was extracted with toluene and the extract was dried over magnesium sulfate and evaporated to dryness under an atmosphere of nitrogen. 4.913 gm of raw product was obtained. 5 cc of hexane were added thereto and the mixture was held overnight at 0°C. 4.46 gm of crystallized product were recovered which were taken up with 25 cc of isopropyl ether and held for a period of 6 hours at 0°C.

4.13 gm (94 percent yield) of 3-chloro-5-acetoxy-17β-benzoyloxy-4,5-seco-Δ$^{2,5(10),9(11)}$-estratriene having a melting point of 124°C and a specific rotation $[\alpha]_D^{20} = +93° \pm 1°$ (c. = 0.5 percent in dioxane) were obtained.

The product occurred in the form of needles and was soluble in alcohol, ether, acetone, benzene, chloroform, hot isopropyl ether and hot hexane and insoluble in water and dilute aqueous acids and alkalis.

Analysis: $C_{27}H_{31}O_4Cl$; molecular weight = 454.98;
calculated: C 71.27%, H 6.87%, Cl 7.79%. Found: C 71%, H 6.7%, Cl 7.9%.

STEP B: 3-chloro-17β-benzoyloxy-4,5-seco-Δ$^{2,9,11}$-estratriene-5-one 2.5 gm of 3-chloro-5-acetoxy-17β-benzoyloxy-4,5-seco-Δ$^{2,5,(10),9(11)}$-estratriene were dissolved in 7.5 cc of anhydrous collidine and 12.5 cc of acetic acid were added thereto. The reaction mixture was cooled to 5°C and slowly a solution of acetic acid containing 10.75 percent of bromine was added. 1.94 gm of bromine were introduced and the reaction mixture was then poured into a mixture of 100 cc of water, 50 cc of ether and 60 gm of sodium bicarbonate. After 50 cc of ether were added thereto, the aqueous phase was removed by decantation and the ethereal solutions were washed with an aqueous solution saturated with sodium bicarbonate and with water. The washed solutions were dried over magnesium sulfate and 3-chloro-11-bromo-17β-benzoyloxy-4,5-seco-Δ$^{2,9}$-estradiene-5-one was obtained in ethereal solution. This solution could be utilized as such in the next step of the operation.

Dehydrobromination

A mixture of 2.5 gm of lithium bromine, 2.5 gm of lithium carbonate and 37.5 cc of dimethylformamide was heated to 100°C and slowly the ethereal solution of the 11-brominated derivative obtained above was introduced. Then the reaction mixture was maintained for 17 hours at 100°C. After cooling, the contents of the reaction vessel were poured into a mixture of 8.5 cc of acetic acid, 100 cc of water and 50 cc of ether. 50 cc of ether were added thereto and the aqueous phase was eliminated by decantation. The ethereal solutions were washed with water and evaporated to dryness under vacuum.

2.4 gm of raw product were recovered which were redissolved in methylene chloride containing one part per thousand of pyridine and the solution was passed through a column containing 23 gm. of magnesium silicate. The column was eluted with methylene chloride containing one part per thousand of pyridine to obtain 2.06 gm (91 percent yield with reference to the product obtained in Step A) of 3-chloro-17β-benzoyloxy-4,5-seco-Δ$^{2,9,11}$-estratriene-5-one.

It occurred in the form of a resin and was very soluble in the usual solvents and had the following ultraviolet spectra:

λ max. 289 mμ; $E^{1\%}_{1\ cm} = 389$ $\lambda$ max. 289 m$\mu$; $E^{1\%}_{1\ cm}$ = 412

STEP C: 17$\beta$-benzoyloxy-4,5-seco-$\Delta^{9,11}$-estradiene-3,5-dione 1.82 gm of 3-chloro-17$\beta$-benzoyloxy-4,5-seco-$\Delta^{2,9,11}$-estratriene-5-one obtained in Step B were triturated with 12 cc of sulfuric acid until total dissolution occurred and the resulting solution was poured into an aqueous solution of sodium bicarbonate. The aqueous solution was washed and extracted with ethyl ether. The ethereal extract was washed with sodium bicarbonate in a saturated aqueous solution and with water, dried over magnesium sulfate and evaporated to dryness under vacuum.

1.72 gm of resin were obtained which were dissolved in methylene chloride and the solution passed through a column of 193 gm. of magnesium silicate. The column was eluted with methylene chloride, then with methylene chloride containing 0.5 percent of acetone and 0.921 gm of product were recovered which were dissolved in hot isopropyl ether. The isopropyl ether solution was iced for a period of 2 hours and 0.885 gm of 17$\beta$-benzoyloxy-4,5-seco-$\Delta^{9,11}$-estradiene-3,5-dione having a melting point of 138°–139°C were obtained.

The product occurred in the form of prisms and was soluble in alcohol, ether, acetone and hot isopropyl ether and insoluble in water and dilute aqueous acids and alkalis.

The ultraviolet spectra confomed to the assigned structure.

STEP D: 17$\beta$-benzoyloxy-$\Delta^{4,9,11}$-estratriene-3-one 0.400 gm of 17$\beta$-benzoyloxy-4,5-seco-$\Delta^{9,11}$-estradiene-3,5-dione were dissolved in 4 cc of toluene under an inert atmosphere. The solution was cooled to 3°C and 0.48 cc of a solution of sodium tert.-amylate diluted in 4.8 cc of anhydrous toluene prepared by refluxing 20 cc of toluene, 6.25 cc of tert.-amyl alcohol and 1.4 gm of sodium for 15 hours in an inert atmosphere were added. The reaction mixture was maintained between 0° and +5° C for a period of 6 hours under agitation and an inert atmosphere and then 5 cc of a 0.2 N solution of acetic acid in toluene were added. The reaction mixture was extracted with toluene and evaporated to dryness. The residue was taken up with ethyl acetate and evaporated to dryness under vacuum. A resin was obtained which was dissolved in methylene chloride. The solution was passed through a column containing 40 gm of magnesium silicate. The column was eluted with methylene chloride containing 0.5 percent of acetone and 0.361 gm of a raw product were thus recovered. This product was dissolved in 1.5 cc of isopropyl ether and after the solution was added to hot methanol, it was allowed to stand at 0°C over night. 0.324 gm (85% yield) of 17$\beta$-benzoyloxy-$\Delta^{4,9,11}$estratriene-3-one having a melting point of 154°C and a specific rotation $[\alpha]_D^{20}$ = + 117° (c. = 0.47 percent in ethanol) were obtained.

The product occurred in the form of needles and was soluble in benzene, hot methanol, hot acetone and hot cyclohexane and insoluble in water and dilute aqueous acids and alkalis.

Analysis: $C_{25}H_{26}O_3$; molecular weight = 374.46;
Calculated: C 80.18%, H 7.000 12.81%
Found: C 80.3%, H 7.1%, O 12.8%

STEP E: $\Delta^{4,9,11}$-estratriene-17-$\beta$-ol-3-one 3 gm of 17$\beta$-benzoyloxy-$\Delta^{4,9,11}$-estratriene-3-one were dissolved in 15 cc of methanol. 0.030 gm of hydroquinone was added and the reaction mixture was heated to reflux while bubbling nitrogen therethrough. Then 1.2 cc of a methanolic solution containing 11 percent potassium hydroxide were added and the reflux was maintained for a period of three hours. Then the solution was acidified with 0.36 cc of acetic acid and the methyl benzoate formed was eliminated by steam distillation. 2.140 gm of a raw product were obtained which product was dissolved in 20 cc of methylene chloride.

The solution was passed through 10 parts of magnesium silicate and eluted with 250 cc of methylene chloride containing 5 percent of acetone. The weight after evaporation of the solvents was 2.050 gm. This product was recrystallized from isopropyl ether to obtain 1.930 gm (89 percent yield) of $\Delta^{4,9,11}$-estratriene-17$\beta$-ol-3-one having a melting point of 186°C and a specific rotation $[\alpha]_D^{20}$ = + 19° (c. = 0.45 percent in ethanol).

The product occurred in the form of crystals and was soluble in ether, acetone and hot methanol and insoluble in water and dilute aqueous acids and alkalis.

Analysis: $C_{18}H_{22}O_2$; molecular weight = 270.36
Calculated: C 79.96%, H 8.20%, O 11.83%
Found: C 80%, H 8.2%, O 12%

STEP F: 17$\beta$-acetoxy-$\Delta^{4,9,11}$-estratriene-3-one.

0.300 gm of $\Delta^{4,9,11}$-estratriene-17$\beta$-ol-3-one were dissolved in 3 cc of pyridine at room temperature. 1.5 cc of acetic acid anhydride were added and the reaction mixture was agitated for a period of four hours under a nitrogen atmosphere. The reaction mixture was precipitated in water, iced and the gum obtained was extracted with methylene chloride. After washing, the organic phase was dried and concentrated to dryness under vacuum. The residue was dissolved in methylene chloride and the solution was passed through a column of magnesium silicate. After elution with methylene chloride containing 1 percent of acetone and recrystallization in isopropyl ether and hexane, 0.297 gm (78 percent yield) of 17$\beta$-acetoxy-$\Delta^{4,9,11}$-estratriene-3-one having a melting point of 96°–97° C and a specific rotation $[\alpha]_D^{20}$ = + 36.8° (c. = 0.37 percent in methanol) were obtained.

The product occurred in the form of colorless platelets and was ver soluble in benzene and chloroform, soluble in alcohol and insoluble in water.

The ultraviolet and infrared spectra were in accord with the assigned structure.

Anlysis: $C_{20}H_{24}O_3$; molecular weight = 312.39
Calculated: C 76.89%, H 7.74%
Found: C 76.7%, H 7.6%

EXAMPLE II

A mixture of 5 g of 17$\beta$-acetoxy-$\Delta^{4,9,11}$-estratriene-3-one previously ground in a humid media and 495 g of dry ground and screened glycocoll were dry mixed for 12 hours and the resulting mixture was then distributed into powder flacons holding 10 g. The bottles were then sterilized by exposure to ethylene oxide vapor and then sealed. The powder contained 1 percent by weight of the active ingredient.

EXAMPLE III 5 g of 17$\beta$-acetoxy-$\Delta^{4,9,11}$-estratriene-3-one dissolved in 25 cc of methylchloroform were admixed with 250 g of glycocoll and the resulting powder was placed on plates and dried in vacuo at room temperature. The dried powder was then screened and distributed under sterile conditions into 10 g flacons. If desired, a perfume agent, coloring agent and/or a surface-active agent to insure a better dispersion could be added.

CLINICAL STUDY

A. The effectiveness of 17β-acetoxy-$\Delta^{4,9,11}$-estratriene-3-one in the form of a topical powder containing 1 percent by weight of the active ingredients for the treatment of eschars and subordinately to estimate its activity on ulcers or torpid wounds was determined in a medical facility for aged, chronically ill patients. The recruitment of the subjects was relatively difficult as subjects with eschars falling within the framework of the study are not as easy to find as one would expect.

Elderly patients who are subjected to attentive and daily care in a thorough nursing home are mostly healed of any eschars. The patients who do develop at a certain time eschars in spite of the supervision and precautions usually are afflicted with a concurrent complication, infectious or most generally vascular, in other words, a fatal prognosis with death following shortly. This resulted in a rather large percentage of the tests before the results could be obtained.

Between the two said extremes, there are relatively few patients with eschars falling within the framework of the study. Over a period of 5 months, only 11 cases with eschars were available and three other cases involved the treatment of two cases of ulcers and one case of a torpid wound.

The cases studied involved five men and nine women with an average age of 70; two were about 60, 10 were between 71 and 86 years old and two were over 90 years old. The patients were hospitalized for the following general ailments: seven neurologic cases, three cardio-vascular cases, two traumatic (fractures) cases, one neoplasic case and one various case. With respect to the eschars, the 11 cases were classified as five extensive eschars, two average eschars and four small eschars. The small eschars which usually occurred on the heel but also on the elbow and buttocks were 2 to 3 cm in diameter and the extensive eschars which occurred most frequently on the buttocks had a diameter of at least 7 cm with a deep escavation.

The treatment of the eschar cases involved cleaning of the lesion and then light powdering with the powder containing 17β-acetoxy-$\Delta^{4,9,11}$-estratriene-3-one 3 to 6 times a week, depending upon the seriousness of the lesion. The average treatment time was 4 weeks. Out of the 11 eschar cases, the results were excellent in four, good in five and average in two, with absolutely no failures.

One of the four excellent results was obtained on a 59 year old man afflicted with sclerosis spots and having a deep, extensive eschar of 7 cm diameter on the buttocks. The eschar had resisted conventional treatment for more than 3 months, but after treatment with 17β-acetoxy-$\Delta^{4,9,11}$-estratriene-3-one for 4 weeks, there was a spectacular reduction in the depth of the eschar which had shrunk to a diameter of 2 cm with the disappearance of pain.

Two other excellent results were observed with eschars of small dimensions and the fourth excellent result was obtained on a 91 year old diabetic patient hospitalized by a fracture of the thigh bone "neck" complicated by acute pneurpathy. At the beginning, the sanies eschar was 7 × 5 cm and after 3 months treatment with Epithao (aortic pulp extract), Mitosyl (cod liver oil and flounder liver oil ointment), Plastenan (drinkable solution of sodium N-acetylano-6-hexanoate), Madecassol (2 percent powder of Centella asiatic extract) and Biogaze (dressing based on camphor, cajupat oil, thyme oil, liposoluble cupric chlorophyll extract, flounder oil and cod liver oil), the eschar was reduced to 3 × 1 cm and no further improvement was seen in the next month. After one month of treatment with 17β-acetoxy-$\Delta^{4,9,11}$-estratriene-3-one, healing was substantially complete.

A torpid wound which had shown no improvement after 2 months of various treatment was treated for 1 month with 17β-acetoxy-$\Delta^{4,9,11}$-estratriene-3-one with excellent, spectacular results. Two ulcers were treated, one with excellent results and one with no improvement. The tolerance for the said product was good.

B. Study of Healing of Atonic Wounds

The patients of this study were selected from the Paraplegic Service of the French National Institution for Invalides who were extremely difficult patients. The neuro-vegetative syndromes and the sympathico-vascular disconnection of these subjects make them extremely vulnerable to any nursing error, any carelessness and any act of noncompliance.

The usual sphincteral troubles are at the origin of bedsore super-infections, ischiatic and sacral in most cases. Medicated treatments are usually insufficient to obtain healing of lesions, a result more often reached by surgical therapy; curettage, grafts, plastic surgery, etc. The experimentation was stopped at the end of approximately 3 months. Most of the patients studied did not have 3 months of treatment; certain ones were stopped because of "healing"; others, though not actually healed, derived a benefit from the product for only a few weeks or a few days. Observations must be deduced from the study, as the patients did not benefit from a treatment of sufficiently long duration. The iconography supplied is particularly rich and the observations were established with great care.

LOCALIZATION OF THE SORES

Sacral sores: obs. No. 1, 2, 3, 4, 5, 13.
Ischiatric sores: obs. No. 6, 8, 9, 10, 11, 12.
Trochanteric sores: obs. No. 12, 13.
Ischio-trochanteric sores: obs. No. 17
Ischiatic sores with ischiatic hygroma pouch, obs. No. 7
Ischiatic hygroma pouch: obs. No. 4.
Sores in the lower members
  multiple: obs. no. 2, 18
  thigh (abscess):obs. No. 17
  super malleolar: Obs. No. 16
Genital organs (Scrotum):
  disunion of an epididymectomy scar; obs. No. 14
  after-effect of the incision of an abscess of the cordon with urethral fistula; obs. No. 15.

After washing and cleaning with ether or alcohol-ether, daily sprinkling with the powder was effected in 17 cases out of 18 patients with sprinkling being done every other day for observation No. 18. Occlusive dressings could not be avoided in seven cases (obs. No. 4, 5, 14, 15, 16, 17, 18) were set in place only at night in two cases (obs. No. 1,2), and the lesion was exposed to the air in the nine other patients.

Protection of the sores during bowel movements was systematic. However, patient No. 2, tearing off his cystostomic drain, soils himself fairly frequently. Patient No. 17 (tetraplegic through tubercular meningitis, now again active) perspires profusely. Soaking seems a reef to be feared (obs. No. 5, 6) and as soon as the dressing is wet, the compress is renewed without touching the wound (obs. No. 14, 15, genital organs, urethral fistula). In two subjects with enormous purulent ischiatic hygroma pouches 8 and 7 cm deep, instillations with a solution of the test compound prepared extemporaneously were used cobs. No. 4, 7).

ASSOCIATED TREATMENTS

1. Local treatments:

No local treatment was associated with the test powder. Previous local treatments were mentioned in several observations:

Paikinase: obs. No. 1, 16
Trypsine obs. No. 1
Plastenan Obs. No. 3
Mitosyl: Obs. No. 3
Placenta: Obs. No. 3

Various healing agents in pomade or solution, used without results for 4 months: Obs. No. 12.

Healing pomades, eosin, various powders used without results: obs. No. 13.

All healing treatments, in pomade, solution and powder without results: obs. No. 16.

Intrafemoral infiltrations of xylocaine, Cobaltyl, Pronestyl, undertaken to promote healing resistant to usual pomades, with mediocre results: obs. No. 18.

2. Antibiotic Therapy:

Antibiotic therapy used before experimentation:
General: obs. No. 1, 2, 3, 10, 15
Local: obs. No. 7 (Soframycin x hydrocortisone)
    obs. No. 10 (Polymixin, pyocyanic infection)

Associated during experimentation: antibiotic therapy.
General: obs. No. 12, to cover plastic surgery necessitated by a trochanterial sore with large development, for which R 1697 had not been used.

Urinary antiseptics and specific anti-tubercular therapy (INH): obs. No. 17, tubercular meningitis.

Specific anti-tubercular therapy: obs. No. 18, pulmonary tuberculosis.

Aside from the usual care of very codified nursing provided by particularly qualified personnel, six patients (obs. No. 2, 3, 8, 9, 10, 12) were treated by per-case massage, *in periphery* of the sore. The condition of the patient of observation No. 4 also required weekly transfusions.

In the study of the results, three observations: Obs. No. 10 (6 days of treatment), obs. No. 13 (10 days of treatment), obs. No. 16 (14 days of treatment) cannot be reasonably interpreted. The number of usable observations is therefore reduced to 15.

1. Healing

In 15 observations, 7 treatments were stopped because of healing:

No. 9: healing obtained in 15 days
No. 6: healing obtained in 17 days
No. 8 healing obtained in 18 days
No. 14: healing obtained in 33 days
No. 3: healing obtained in 41 days
No. 12 healing obtained in 42 days
No. 17: healing obtained in 85 days.

Among these seven patients, four had sores of relatively lesser importance: No. 6, 8, 9, 12. However, one must note the sub-depressive state of the patient of observation No. 6, the disunion of 4 cm by 1 cm and 1.5 cm deep of the sore resulting from the orchiepididymitic intervention of patient no. 14, the result obtained with difficulty, but positive, of patient No. 17, tetraplegic because of still active tubercular meningitis.

The proportion of healing, therefore of excellent results, is 46.6 per 100.

2. Improvement

Two improvements are observed: in patient no. 2, after 76 days; this patient is affected with a urinary infection with arteritis, his psychic state is failing and he is little cooperative; in patient No. 15, with a scar diminishing from 3 cm × 2 cm, 2 cm deep, to ¾ cm in diameter in 10 days (Nov. 28, 1970 to Dec. 7, 1970); on January 12, 1971, orifice is ½ cm in diameter, but with urethral fistula requiring subsequent plastic surgery, done under better conditions.

The proportion of improvement is 13.3 per 100; together with the cases of healing, 60 per 100 of positive results.

In the 40 per 100 of disappointing cases, we find, Observation No. 1; a 21 year-old Martinican, tetraplegic, with fits of urinary fever, permanent perspiration, in mediocre general condition, and with only 21 days of treatment.

Observation No. 4: mediocre field, infected, voluminous sacral sore under occlusive dressing (soaking). The results are qualified as positive, but hardly spectacular.

Observation No. 5; 30 year old North African, undisciplined, bearer of an occlusive dressing, hence soaking.

Observation No. 7, ischiatic hygroma 7 cm in depth, treated without result with R 1697 in solution.

Observation No. 11: enormous pouch of initial hygroma, treated by excision and plastic surgery. A post-operative hematoma leads to a large disunion. After 56 days of treatment, despite slow healing, hemorrhagic tendency causing cessation of treatment.

The Howel times required are normal, the rate of protothrombin is 88 per 100. A deeper exploration of the blood crasis is not done; pro-accelerine rate, proconvertine rate, fibrine dosage, thrombo-elastogram; this might possibly have brought out an "infra-clinical" coagulation disturbance eventually responsible for the post-operatory hematoma, prior to the experimentation, and for the bleeding of the scar at each dressing.

Observation No. 18 is that of a North African, cachectic, pulmonary tubercular, uncooperative.

In these six observations we find only patients in very poor general condition, treated with occlusive dressings (4, 5, 18), without results with the test compound in solution, and a psycho-sociologic factor may emerge: two North Africans, one Martinican account for 50 per 100 of the poor results.

Various modifications of the compositions and method of the invention may be made without departing from the spirit or scope thereof and it is to be understood that the invention is to be limited only as defined in the appended claims.

I claim:

1. A composition for healing of skin wounds comprising 0.5 to 10 percent by weight of $17\beta$-acetoxy-$\Delta^{4,9,11}$-estratriene-3-one and a topical pharmaceutical powder carrier.

2. The composition of claim 1 in powder form and wherein the carrier is selected from the group consisting of amino acids, talc and polyhydroxylated compounds.

3. A method of healing skin wounds topically which comprises applying daily to skin wounds of humans an effective amount of $17\beta$-acetoxy-$\Delta^{4,9,11}$-estratriene-3-one.

* * * * *